United States Patent [19]

Leigh

[11] Patent Number: 5,082,160
[45] Date of Patent: Jan. 21, 1992

[54] APPARATUS AND PROCESS FOR ULTRASONIC SEAM WELDING STAINLESS STEEL FOILS

[75] Inventor: Richard W. Leigh, New York, N.Y.

[73] Assignee: Gas Research Institute, Chicago, Ill.

[21] Appl. No.: 463,323

[22] Filed: Jan. 10, 1990

[51] Int. Cl.⁵ ............................................. B23K 20/10
[52] U.S. Cl. ..................................... 228/110; 228/1.1; 228/54
[58] Field of Search ........................... 228/1.1, 54, 110

[56] References Cited

U.S. PATENT DOCUMENTS

| | | | |
|---|---|---|---|
| 2,501,616 | 3/1950 | Robinson | 228/54 X |
| 2,833,238 | 5/1958 | Jones et al. | 228/1.1 X |
| 3,017,792 | 1/1962 | Elmore et al. | 228/1.1 |
| 3,088,343 | 5/1963 | Balamuth et al. | 228/1.1 |
| 3,217,957 | 11/1965 | Jarvie et al. | 228/1.1 |
| 3,360,850 | 8/1968 | Avila | 228/110 |
| 3,418,196 | 12/1968 | Luc | 228/110 X |
| 3,541,671 | 10/1970 | Frachot | 228/110 |
| 3,899,377 | 9/1975 | Luc | 156/73.5 |
| 3,952,937 | 4/1976 | Lamons et al. | 228/1.1 |
| 4,106,167 | 8/1978 | Luc | 228/114 X |
| 4,144,110 | 3/1979 | Luc | 229/112 X |
| 4,333,791 | 7/1982 | Onishi | 228/1.1 X |
| 4,591,087 | 5/1986 | Frasch | 228/110 |
| 4,601,089 | 7/1986 | Gal | 228/118 |

OTHER PUBLICATIONS

*Metals Handbook*, 9th Edition, vol. 6, pp. 748, 755, 752-753.

Primary Examiner—Kenneth J. Ramsey
Attorney, Agent, or Firm—Speckman & Pauley

[57] ABSTRACT

An ultrasonic seam welding apparatus having a head which is rotated to form contact, preferably rolling contact, between a metallurgically inert coated surface of the head and an outside foil of a plurality of layered foils or work materials. The head is vibrated at an ultrasonic frequency, preferably along a longitudinal axis of the head. The head is constructed to transmit vibration through a contacting surface of the head into each of the layered foils. The contacting surface of the head is preferably coated with aluminum oxide to prevent the head from becoming welded to layered stainless steel foils.

28 Claims, 1 Drawing Sheet

APPARATUS AND PROCESS FOR ULTRASONIC SEAM WELDING STAINLESS STEEL FOILS

This invention was made as a result of work under Contract No. DE-AC02-76CH00016 granted by the United States Department of Energy.

BACKGROUND OF THE INVENTION

1. Field of the Invention

This invention relates to an apparatus and process for ultrasonic seam welding of ferrous metal foils, particularly stainless steel foils, that uses a weld wheel or head having a peripheral surface coated with aluminum oxide.

2. Description of the Prior Art

The ability to weld metal foils is an important aspect of quality control in fabricating mechanical components from relatively thin metallic materials. In applications using relatively heavy gauge materials, such as thicknesses of 50 mils and greater, welding processes such as arc welding, brazing and the like are reliable but often costly in terms of labor. It is difficult to produce reliable bonds or to avoid burning out the work materials when welding lighter gauge materials, such as thin strips and metal foils.

In certain applications, such as heat exchangers, spot welds are not adequate for constructing the mechanical equipment. In order to adequately construct a seam weld without using ultrasonic seam welding techniques, it is possible to use either laser welding or electron beam welding techniques. However, such techniques are undesirable since they require quite expensive processes. In addition, electron beam welding is not a reliable process for bonding very thin foils. Ultrasonic seam welding is preferred since it does not melt the weldment or even heat it to annealing temperatures in most cases. The ultrasonic seam welding process operates through cold working. By bonding the materials through a cold working process, corrosion resistance at an ultrasonic seam weld is much higher than corrosion resistance at a seam produced through brazing, or welding, where the weldment is melted and recrystallized.

The ultrasonic welding process can fail when the work material of the foil sticks or bonds directly to the weld wheel or disc, or when two or more metal foils fail to bond together, or when the ultrasonic welding process weakens or damages the metal foils. Although all of these problems have been overcome for many non-ferrous foils, such as aluminum, copper and nickel foils, all three problems occur, either singly or in combination, when attempts are made to ultrasonically weld stainless steel or other ferrous foils using prior art processes or apparatuses.

U.S. Pat. No. 3,217,957 discloses a welding apparatus having a rotatable disc which is acoustically coupled to an ultrasonic vibrator. The disc is adapted for rolling peripheral engagement with the work materials. The ultrasonic frequency vibrations are transmitted to the disc such that the peripheral surface of the disc vibrates at a determined frequency. The disc vibrates in a direction transverse to the direction of its rotation. The '957 patent teaches ultrasonic seam welding of aluminum foils but does not teach or describe either an apparatus or a process for ultrasonically seam welding stainless steel or ferrous foils.

U.S. Pat. No. 4,144,110 discloses a dynamic friction bonding process in which friction is created by high-speed relative movement between a friction tool and a solid surface with which the friction tool is in contact. The '110 patent discloses many different materials that can be cohesively bonded, including dissimilar metals. However, the '110 patent does not specifically mention a process or apparatus for bonding either stainless steel or other ferrous metals through ultrasonic vibration.

U.S. Pat. No. 4,106,167 teaches a dynamic friction bonding process for formation of adhesive or cohesive bonds between metal parts, particularly applicable to the formation of metal cans, drums or other tubular containers. All bonding examples, as disclosed in the '167 patent, relate to tin plated steel, chrome-chrome oxide coated steel, or aluminum. The '167 patent does not disclose an apparatus or process in which bonding occurs primarily because of ultrasonic vibrations or which uses a weld wheel or disc coated with aluminum oxide to prevent bonding between the weld wheel or disc and stainless steel foils.

U.S. Pat. Nos. 3,088,343, 4,333,791, 3,418,196, 4,591,087 and 3,360,850 generally relate to processes or apparatuses for conventional ultrasonic seam welding. The '791 patent discloses an ultrasonic seam welding apparatus which has a cylinder that is vibrated at an ultrasonic frequency; the cylinder is positioned beneath a rotatable weld wheel and the work material is seam welded as it travels between the cylinder and weld wheel.

U.S. Pat. No. 2,833,238 discloses an ultrasonic brazing unit which is used to effect brazed joints with high-melting non-ferrous filler metals. U.S. Pat. No. 3,541,671 discloses a process for fixing paper to a metal foil, particularly an aluminum foil. U.S. Pat. No. 3,899,377 discloses a process for formation of adhesive or cohesive bonding in or to aluminum.

The prior art sufficiently describes processes and apparatuses for bonding non-ferrous metal foils through ultrasonic seam welding. However, the prior art does not disclose a process or apparatus for ultrasonically seam welding ferrous metal foils, particularly stainless steel foils. Thus, there exists a need for a process and apparatus which can be used to ultrasonically seam weld stainless steel foils, without the weld wheel or head sticking or bonding directly to the work material.

SUMMARY OF THE INVENTION

It is one object of this invention to provide an ultrasonic seam welding apparatus and process in which stainless steel metal foils can be ultrasonically seam welded without the weld wheel or head bonding to the stainless steel foil as the weld wheel or head makes rolling contact with the stainless steel foil.

According to one preferred embodiment of this invention, an ultrasonic seam welding apparatus has a head which is rotated to form rolling contact between a peripheral surface of the head and an outside foil of a plurality of layered foils. It is apparent that the layered foils can include multiple foils placed upon one another or one foil overlapping itself to form more than one layer.

The head is vibrated at an ultrasonic frequency along a longitudinal axis of the head. The head is constructed to transmit vibration through the peripheral surface of the head into each of the layered foils. In a preferred embodiment of this invention as in most conventional ultrasonic seam welding apparatuses, the head is constructed of a ferrous material, preferably a high carbon steel.

In one preferred embodiment of this invention, it is an important aspect that the peripheral surface of the head is coated with a metallurgically inert material, such as aluminum oxide. When the head is coated with aluminum oxide, such that only the aluminum oxide coating of the head contacts the outside foil, bonding between the head and a stainless steel foil is eliminated. Such provision allows ultrasonic seam welding of stainless steel foils, which has long been desired by those skilled in the art.

BRIEF DESCRIPTION OF THE DRAWINGS

The above objects and advantages of this invention are described in preferred embodiments and shown in the drawing wherein.

DESCRIPTION OF THE PREFERRED EMBODIMENTS

Figure 1:
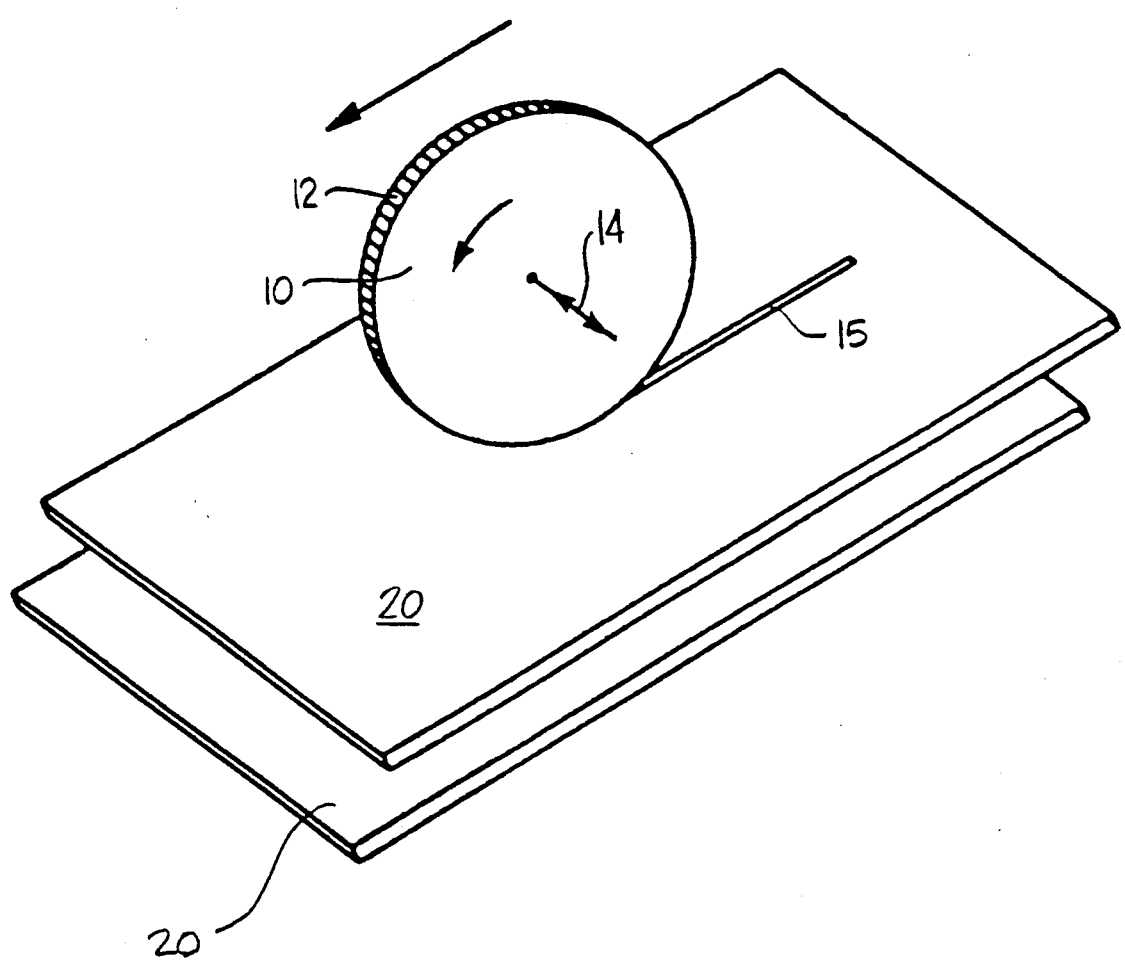
FIG. 1 shows a perspective view of a weld wheel or head and two layered metal foils.

Referring to FIG. 1 which shows one preferred embodiment of this invention, the ultrasonic seam welding apparatus is generally illustrated by head 10. Throughout the specification and claims, the term "head" is intended to relate to a weld wheel, weld head, a disc or other similar terms familiar in the art of ultrasonic seam welding. FIG. 1 does not show the remainder of the ultrasonic seam welding apparatus; however, such apparatuses and their components are well known in the art. A typical ultrasonic seam welding apparatus is described in U.S. Pat. No. 3,217,957, another is described in U.S. Pat. No. 4,333,791.

The ultrasonic seam welding apparatus of this invention includes head displacement means for rotating head 10 and forming rolling contact between peripheral surface 12 of head 10 and outside foil 20 of a plurality of layered foils 20.

Vibration means are used to vibrate head 10 at an ultrasonic frequency along longitudinal axis 14 of head 10. Such vibration means are well known in the art, such as &he vibration means of the welding apparatus described in U.S. Pat. No. 3,217,957. Head 10 is constructed so as to transmit ultrasonic frequency vibration through peripheral surface 12 of head 10, into each of layered foils 20. In a preferred embodiment according to this invention, head 10 is constructed of a ferrous material, such as a high carbon steel. Such ultrasonic frequency vibration within layered foils 20 causes bonding between layered foils, along path 15 of head 10.

According to one preferred embodiment of this invention, head 10 vibrates at an ultrasonic frequency of approximately 20 kHz. Three dynamic parameters govern the quality of results produced or quality of an ultrasonic seam weld: the power transmitted through head 10 as a high frequency mechanical wave, preferably at a frequency of about 20 kHz; the "clamping force" with which head 10 is applied against foil 20 or another work piece; and the speed with which head 10 moves along foil 20 or another work piece. For given materials and thicknesses of foils 20, such parameters must be adjusted to arrive at particular values that provide maximum weld strength.

When using head 10 that comprises a ferrous metal, it is commonly known in the art that aluminum, copper and nickel foils can successfully be ultrasonically seam welded. However, when a ferrous metal head 10 is used to ultrasonically seam weld stainless steel foils, head 10 tends to bond directly to the stainless steel foils and thus prevent ultrasonic seam welding of stainless steel foils.

The bonding between head 10 and foils 20 occurs since there is no slippage of head 10, relative to outside foil 20, and thus the static contact between head 10 and outside foil 20 allows the bond to form.

In one preferred embodiment of this invention, peripheral surface 12 of head 10 is coated with a metallurgically inert material. Metallurgically inert materials, such as aluminum oxide, are resistant to cohesive bonding. It is apparent that other metallurgically inert materials can be used to eliminate the bonding between head 10 and ferrous foils 20. It is also apparent that in lieu of peripheral surface 12 of head 10, other mechanical components of the ultrasonic seam welding apparatus can be coated with the metallurgically inert material. For example, U.S. Pat. No. 4,333,791 discloses an ultrasonic seam welding apparatus which has a flat surface of a cylinder that is vibrated at an ultrasonic frequency. An improvement according to one preferred embodiment of this invention includes coating the contacting surface of the cylinder of the '791 patent with a metallurgically inert material. Thus, the metallurgically inert material must coat the surface of the vibrating head or other tool so that such head or other tool does not form direct contact with the work material.

An important aspect of this invention is to prevent bonding between head 10 and foil 20. Since under prior art apparatuses and processes the head 10 was bonding to the ferrous metal foil 20 and leading to the rapid deterioration of surface 12, a metallurgically inert coating, unlikely to bond to stainless steel foil 20 was desirable. Union Carbide LA-2, a detonation gun applied ceramic, aluminum oxide ($Al_2O_3$), was tested even though its tensile bond strength is lower than other available coatings. The crystalline aluminum oxide is sapphire, one of the most inert substances known, which has strong internal covalent/ionic chemical bonds that minimize adhesion or cohesive bonding to external materials such as metal foils 20. The chemical inertness of the aluminum oxide also created problems in bonding the aluminum oxide to head 10, but such problems were overcome by the detonation bonding process offered by Union Carbide.

Head 10 coated with the aluminum oxide produced a peripheral surface 12 which, upon microscopic examination, showed an extremely rough, sandpaper-like surface. Such surface helps prevent head 10 from slipping, relative to foil 20, when head 10 makes rolling contact upon foil 20. Low power tests with the aluminum oxide produced no sticking or bonding of the 316 stainless steel to the aluminum oxide coated peripheral surface 12 of head 10. However, at such low power tests, no ultrasonic seam welding occurred. Increasing the power to approximately 100-150 Watts produced consistent, reliable seam welds. Upon visual inspection under 60× microscopic examination, the aluminum oxide coating of peripheral surface 12 did not deteriorate, even after hundreds of feet of ultrasonic seam welding. Reduced deterioration is also an important aspect of this invention since the diameter of head 10 is an important parameter to maintain at a constant, in order to keep the resonance characteristics of the ultrasonic seam welding apparatus constant.

Optimum ultrasonic seam welding results with the aluminum oxide coated head 10, for three mil 316 stainless steel foil, are shown below in Table 1.

TABLE 1

| | Strength of Seam Welds in 316 Stainless Steel (lb/inch) | | | | | |
|---|---|---|---|---|---|---|
| | Power to Load (Watts) | | | | | |
| Sample | 75 | 100 | 150 | 200 | 250 | Speed (in/min) |
| #1 | 22 | 28 | 18 | 17 | 14 | 58 |
| #2 | 25 | 23 | 11 | | | 66 |

As the test results show from Table 1, too much power can significantly decrease the weld strength. Examination of the test welds under an electron microscope showed no visible thinning of the material and no residual boundary between foils 20, in the welded zone. The strengths of the test welds prove adequate for many uses or needs of stainless steel.

Extensive experiments and tests using 316 stainless steel foils 20 have been conducted with the apparatus and process of this invention. Although strong, repeatable welds were only produced with 316 stainless steel, experiments and tests indicate that other stainless steels and ferrous metal foils, such as 1010 carbon steel, can be ultrasonically seam welded with the apparatus and process of this invention, depending upon certain annealing processes of foil 20.

In one preferred embodiment of this invention, the process for ultrasonic seam welding of ferrous foils 20 begins with rotating head 10 forming rolling contact between peripheral surface 12 of head 10 and an outside foil 20 of a plurality of layered foils 20. Head 10 is vibrated at an ultrasonic frequency, preferably about 20 kHz, along longitudinal axis 14 of head 10. Vibration is transmitted through peripheral surface 12 into each layered foil 20. An aluminum oxide coating is continuously positioned between peripheral surface 12 of head 10 and outside foil 20.

It is apparent that a layer of metallurgically inert material must be positioned between peripheral surface 12 of head 10 and the outside foil 20. In one preferred embodiment according to this invention, such positioning is accomplished by head 10 having an aluminum oxide coating. It is apparent that other methods can be used to position a layer of aluminum oxide between head 10 and foil 20; however coating the peripheral surface 12 of head 10 is most efficient. It is an important aspect of this invention that only the metallurgically inert coating of head 10 contact the outside foil 20, so that head 10 does not bond to foil 20.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

I claim:

1. In an ultrasonic seam welding apparatus having a head, head displacement means for rotating the head and forming contact between a contacting surface of the head and an outside foil of a plurality of layered foils, vibration means for vibrating the head at an ultrasonic frequency, the head constructed to transmit vibration through the contacting surface of the head into each of the layered foils, the improvement comprising: said head being constructed of a ferrous material; and a metallurgically inert coating fixedly surrounding the contacting surface of the head so as to prevent contact between said head and said outside foil.

2. In an ultrasonic seam welding apparatus according to claim 1 wherein said metallurgically inert coating is aluminum oxide.

3. In an ultrasonic seam welding apparatus according to claim 1 wherein only said metallurgically inert coating of the head contacts the outside foil.

4. In an ultrasonic seam welding apparatus according to claim 1 wherein the head comprises a disc and the contacting surface of the head is a peripheral surface of the disc.

5. In an ultrasonic seam welding apparatus according to claim 1 wherein the head comprises a disc and the contact surface of the head is a peripheral surface of said disc.

6. In an ultrasonic seam welding apparatus according to claim 5 wherein said disc vibrates at the ultrasonic frequency along a longitudinal axis of said disc.

7. In an ultrasonic seal welding apparatus according to claim 1 wherein the foils are at least one of a stainless steel material and a carbon steel material.

8. An ultrasonic seam welding apparatus comprising:
a head constructed of a ferrous material, head displacement means for rotating the head and forming contact between a contacting surface of the head and an outside foil of a plurality of layered foils;
vibration means for vibrating the head at an ultrasonic frequency, the head constructed to transmit vibration through the contacting surface of the head into each of the layered foils; and
a metallurgically inert coating fixedly surrounding the contacting surface of the head so as to prevent contact between said ferrous head and said foil.

9. In an ultrasonic seam welding apparatus according to claim 1 wherein said foils are at least one of a stainless steel material and a carbon steel material.

10. In an ultrasonic seam welding apparatus according to claim 8 wherein said metallurgically inert coating is aluminum oxide.

11. An ultrasonic seam welding apparatus according to claim 8 wherein only said metallurgically inert coating of said head contacts said outside foil.

12. An ultrasonic seam welding apparatus according to claim 8 wherein said head comprises a disc and said contacting surface of said head is a peripheral surface of said disc.

13. An ultrasonic seam welding apparatus according to claim 8 wherein said head comprises a disc and said contacting surface of said head is a peripheral surface of said disc.

14. An ultrasonic seam welding apparatus according to claim 13 wherein said disc vibrates at said ultrasonic frequency along a longitudinal axis of said disc.

15. In a process for ultrasonic seam welding of ferrous foils in which a head is rotated and forms contact between a contacting surface of the head and an outside foil of a plurality of layered foils, the head is vibrated at an ultrasonic frequency, and the head transmits vibration through the contacting surface of the head into each of the layered foils, the improvement comprising: continuously positioning a metallurgically inert coating between the contacting surface of the head of a ferrous material and the outside foil.

16. In a process for ultrasonic seam welding according to claim 15 wherein the metallurgically inert coating is aluminum oxide.

17. In a process for ultrasonic seam welding according to claim 15 wherein only the metallurgically inert coating of the head contacts the outside foil.

18. In a process for ultrasonic seam welding according to claim 15 wherein the head comprises a disc and the contacting surface of the head is a peripheral surface of the disc.

19. In a process for ultrasonic seam welding according to claim 15 wherein the foils are at least one of a stainless steel material and a carbon steel material.

20. In a process for ultrasonic seam welding according to claim 15 wherein the head comprises a disc and the contacting surface of the head is a peripheral surface of the disc.

21. In a process for ultrasonic seam welding according to claim 20 wherein the disc vibrates at the ultrasonic frequency along a longitudinal axis of the disc.

22. A process for ultrasonic seam welding of ferrous foils including the steps of:
(a) rotating a head of a ferrous material and forming contact between a contacting surface of the head and an outside foil of a plurality of layered foils;
(b) vibrating the head at an ultrasonic frequency;
(c) transmitting vibration through the contacting surface of the head into each of the layered foils; and
(d) continuously positioning a metallurgically inert coating between the contacting surface of the head and the outside foil.

23. In a process for ultrasonic seam welding according to claim 22 wherein the metallurgically inert coating is aluminum oxide.

24. A process for ultrasonic seam welding according to claim 22 wherein only the metallurgically inert coating of the head contacts the outside foil.

25. A process for ultrasonic seam welding according to claim 22 wherein the head comprises a disc and the contacting surface of the head is a peripheral surface of the disc.

26. A process for ultrasonic seam welding according to claim 22 wherein the foils are at least one of a stainless steel material and a carbon steel material.

27. A process for ultrasonic seam welding according to claim 22 wherein the head comprises a disc and the contacting surface of the head is a peripheral surface of the disc.

28. A process for ultrasonic seam welding according to claim 27 wherein the disc vibrates at the ultrasonic frequency along a longitudinal axis of the disc.

* * * * *